Figure 1:
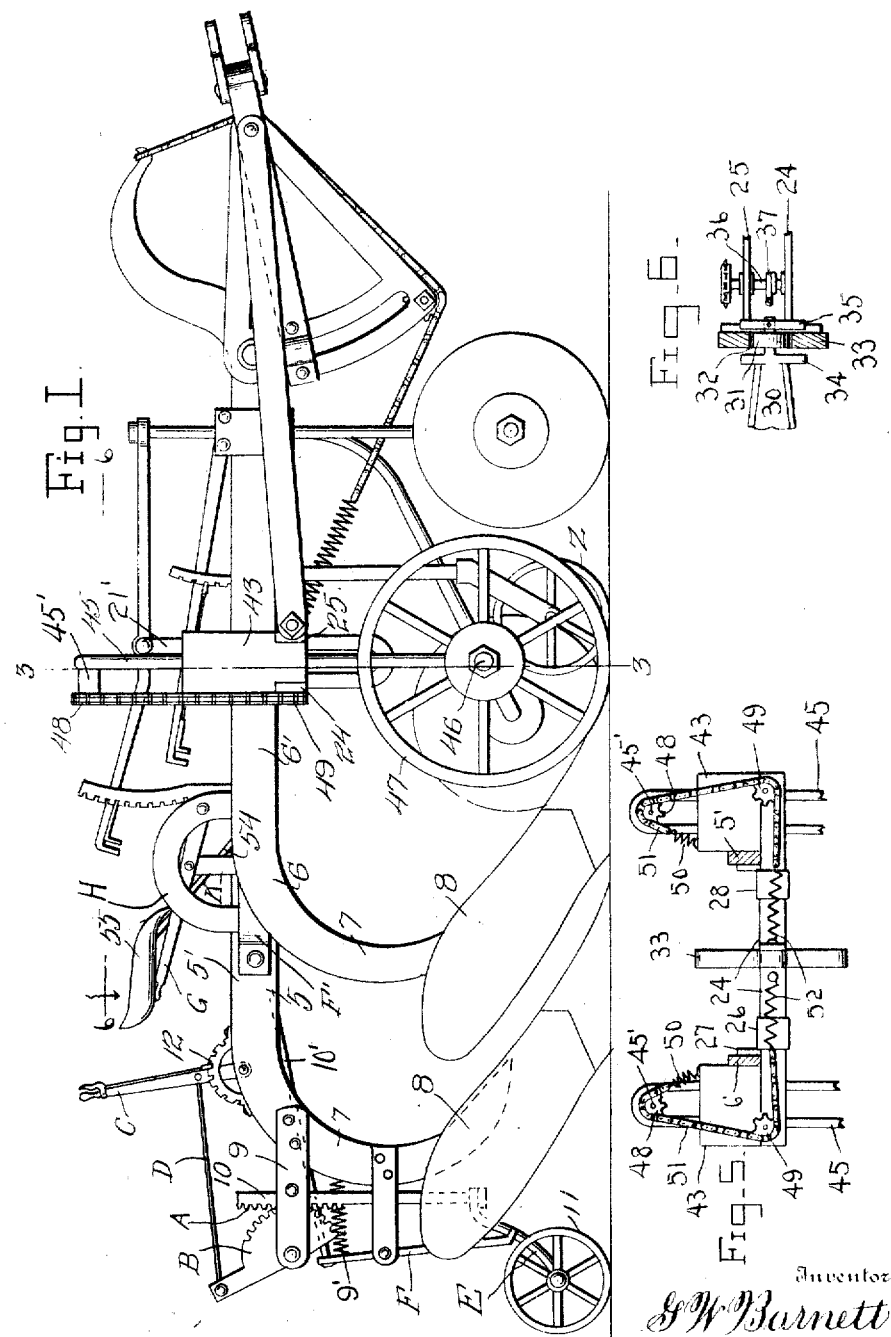

G. W. BARNETT.
GANG PLOW.
APPLICATION FILED AUG. 17, 1906.
916,406.
Patented Mar. 30, 1909.
3 SHEETS—SHEET 2.
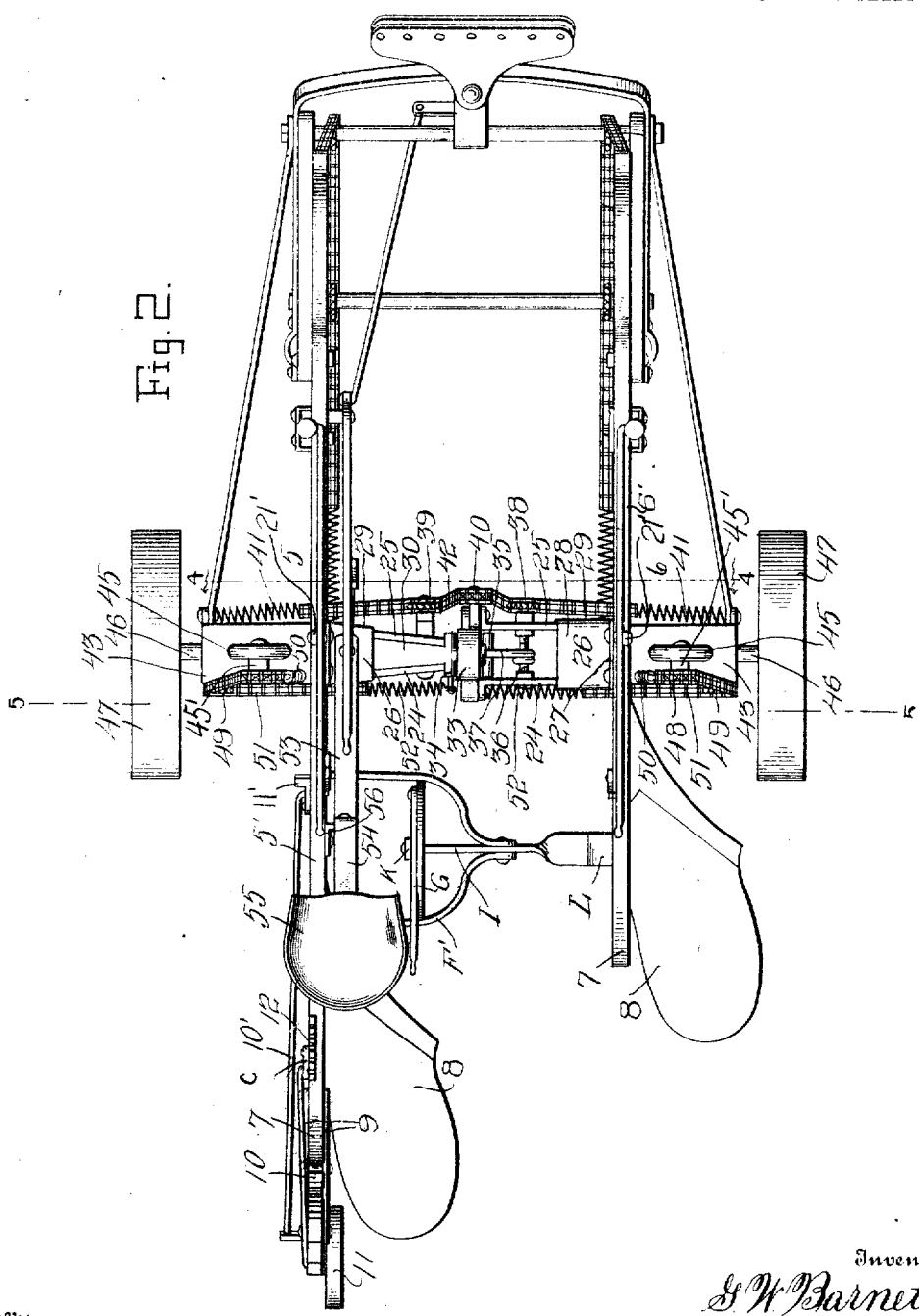
Fig. 2.
Witnesses
C. K. Reichenbach
N. S. Chandee.
Inventor
G. W. Barnett
Attorneys

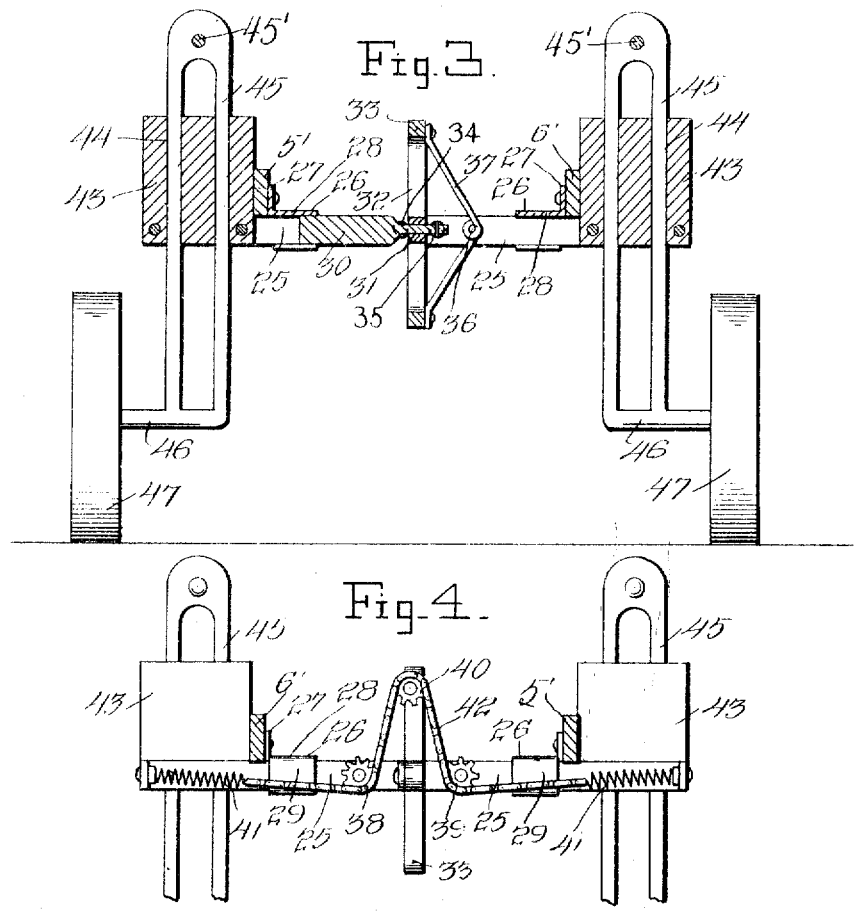

UNITED STATES PATENT OFFICE.

GEORGE W. BARNETT, OF LOUISE, TEXAS.

GANG-PLOW.

No. 916,406.     Specification of Letters Patent.     Patented March 30, 1909.

Application filed August 17, 1906. Serial No. 381,061.

*To all whom it may concern:*

Be it known that I, GEORGE W. BARNETT, a citizen of the United States, residing at Louise, in the county of Wharton, State of Texas, have invented certain new and useful Improvements in Gang-Plows; and I do hereby declare the following to be a full, clear, and exact description of the invention, such as will enable others skilled in the art to which it appertains to make and use the same.

This invention relates to plows and more particularly to wheel plows, and has for its object to provide a plow including a plurality of plowing units which will be susceptible of independent adjustment and which will also be arranged for movement with respect to each other automatically to compensate for inequalities in the surface of the ground.

Another object is to provide a novel arrangement of parts which will tend to produce an efficient implement of the kind described.

Other objects and advantages will be apparent from the following description.

In the drawings forming a portion of this specification, and in which like characters of reference indicate similar parts in the several views, Figure 1 is a side elevation of a complete plow. Fig. 2 is a top plan view. Fig. 3 is a transverse section on line 3—3 of Fig. 1, taken in the plane of the ground wheel slides. Fig. 4 is a section taken on line 4—4 of Fig. 2 transversely of the plow, illustrating the connection of the units and the balancing gear. Figs. 5 and 6 are transverse sections taken respectively on the lines 5—5 and 6—6 of Figs. 2 and 1.

The present invention shown in the drawings, comprises two units 5 and 6, which include plow beams 5' and 6', respectively, the rearward portions of said beams being turned downwardly and forwardly to form stocks 7, the lower ends of which have shares 8 secured thereto. The beam 5' extends a slight distance beyond the rear end of the beam 6', thus disposing the shares in different planes.

The stock of the beam 5' has secured thereto a pair of rearwardly extending straps 9, between which is disposed a slidable upright 10 to whose lower end is swiveled a rearwardly extending arm E upon the offset free end of which a tracker wheel 11 is revolubly mounted. The upright is raised or lowered by means of a lever C fulcrumed upon the stock of said beam and connected by a link D with a rack segment B with a series of teeth A formed upon the upright, the segment being pivoted between the straps 9. Vertical movement of the upright, however, as well as swinging movement of the arm E is normally prevented, owing to the provision of a latch F pivoted centrally to a strap secured to the stock of the beam 5' beneath the first-mentioned straps, the grooved or hooked end of the latch being held in yielding engagement with the arm E by a compression spring 9' interposed between said stock and the upper end of said latch, the extreme upper end of which latter is connected by a link 10' with a foot-lever 11' pivoted to the outer face of the beam 5'. Depression of the foot-lever will therefore release the latch end from engagement with the arm E, to permit vertical movement of the tracker wheel, the lever C for operating said wheel being held in adjusted position by a dog-and-rack mechanism 12, swinging movement of said arm being likewise possible upon such release. The beam 5' is further provided with a horizontal inwardly-extending U-shaped bracket F', whose members are connected intermediate their ends by an arcuate strap H extending upwardly therefrom, which strap has pivoted thereto a lever G connected by a link K with the adjacent end of a horizontal arm I which is pivoted centrally between the inner ends of the members of the bracket F', and is disposed transversely of the beams 5' and 6'.

The free end of the arm I is adapted for engagement with a hook L carried by the beam 6', and when such free end is at the downward limit of its movement, it lies out of the path of movement of said hook, so that said beam may rise, to bring its hook above said arm, whereupon, the latter may be reëngaged with the hook through the medium of the lever G, so as to prevent downward movement of the beam 6' with respect to the beam 5'. Each beam carries a tracker wheel Z which is disposed in advance of the corresponding share 8.

The inner face of each beam has secured thereto intermediate its ends, the vertical arm 27 of an L-shaped bracket 26, the horizontal arms 28 of said brackets extending inwardly toward each other and being provided with depending front and rear flanges 29. These flanges serve to support plates 24 and 25 secured thereto and disposed transversely of the beams, as shown in Fig. 2, said plates resting upon the inturned lower edges of the flanges 29. The plates of the beam 5' are held in spaced relation to each other by means of a block 30 disposed therebetween, and extending inwardly beyond the ends of the plates. At its inner end, said block is provided with pairs of oppositely extending lateral wings 34 and 35, the space between said pairs of wings being reduced and provided with a roller 31 revoluble thereon and movable in a vertical slot 32, formed in a vertical plate 33, which is secured to the inner ends of the plates 24 and 25 of the beam 6'. The pairs of wings 34 and 35, above referred to, are disposed against the opposite sides of the plate 33, thus preventing disengagement of the roller 31 from the slot 32 and in such manner, connect the units 5 and 6. The pair of wings 34 is formed integral upon the block 30, while the pair 35 is removably connected therewith, so as to permit their attachment subsequent to the disposition of the roller within its slot. The plates 24 and 25 of the beam 6' are held in spaced relation to each other by bolts 36, one of said bolts being engaged with the central portion of a brace 37, whose ends are fastened to the ends of the plate 33, to hold the latter in vertical position.

By reason of the disposition of the roller 31, within the slot 32, it will be apparent that the two units 5 and 6 are susceptible of vertical movement with respect to each other. These two units are provided with a balancing gear comprising a pair of sprockets 38 and 39, revolubly mounted adjacent the forward faces of the plates 25 upon the bolts which connect said plates with the corresponding plates 24, and a third sprocket 40 mounted upon the upper end of the plate 33, said sprockets being engaged by a chain 42, whose central portion passes over the sprocket 40, while its ends pass beneath the sprockets 38 and 39 and are connected to helical springs 41, secured at their outer ends to the outer ends of the plates 25. The two units 5 and 6 are thus held yieldably against vertical movement with respect to each other.

Between each pair of the plates 24 and 25, outwardly of their respective plow beams, there is secured a vertical block 43, having longitudinal guide passages 44 formed therein, in which passages are disposed a pair of vertical slides 45, whose lower ends are provided with lateral spindles 46, upon which the ground wheels 47 are revolubly mounted. The upper end of each slide 45 carries a horizontal pin 45' upon which a sprocket wheel 48 is revolubly mounted; each plate 24 is likewise provided at its outer end with a similar pin carrying a sprocket wheel 49. The sprockets 48 and 49 of each unit are engaged by a sprocket chain 51, the upper end of which is connected by a coil-spring 50 with the adjacent block 43. The lower end of each chain is connected to one end of a coil-spring 52, the opposite end of one of said springs being connected with the plate 33, and that of the other spring to one of the laterally-extending wings 34. The slides 45 are thus held yieldably against vertical movement, as will be readily understood. The pairs of plates 24 and 25 and the parts carried thereby, thus form what may be termed transverse sills which are carried by the plow beams and are connected at their inner ends for bodily vertical movement with respect to each other.

One of the brackets 26 has secured thereto a rearwardly-extending metal plate 53, whose upwardly bent rear portion 54 forms a spring support for a seat 55, said support being connected to the beam 5' by a bracket 56.

The operation, it is thought, will be understood without detailed description. As the machine is moved over the ground, the ground-wheels 47 are free to move vertically to compensate for inequalities of the surface, though they are retarded to some extent by the spring mechanism described above and by reason of the arrangement permitting of independent vertical movement of the two units 5 and 6, one of the shares may rise to pass over a hummock which is passed by the other share.

What is claimed is:

1. A machine of the class described, comprising two beams, transverse sills carried by the beams, said sills being connected at their inner ends for vertical movement with respect to each other, ground-treating devices carried by the beams, and means for holding the sills yieldably against movement with respect to each other.

2. A machine of the class described, comprising spaced longitudinally-extending beams, transverse sills carried by the beams and extending oppositely therebeyond, said sills being connected between the beams for bodily vertical movement with respect to each other, means for holding the sills yieldably against such movement, guides carried by the outer ends of the sills, slides mounted in the guides for vertical movement, ground wheels carried by the lower ends of the slides, and means for holding the slides yieldably against movement in the guides.

3. A machine of the class described, comprising a pair of spaced beams, connections between the beams constructed and arranged for bodily vertical movement of the beams with respect to each other, means for holding said beams yeildably against such movement, ground wheels carried by said beams and movable vertically with respect thereto and to each other, means for holding the ground wheels yieldably against such movement, and a ground-treating device carried by each beam.

4. A machine of the class described, comprising a pair of spaced beams, one of said beams having a vertically movable tracker wheel connected therewith, means carried by said beam for raising or lowering said tracker wheel, transverse sills carried by the beams, said sills being connected at their inner ends for vertical movement with respect to each other, ground-treating devices carried by the beams, and means for holding the sills yieldably against movement with respect to each other.

5. A machine of the class described comprising a pair of spaced beams, connections between the beams constructed and arranged for bodily vertical movement of the beams with respect to each other, a balancing gear connected to said beams for holding the same yieldably against such movement, ground wheels carried by said beams and movable vertically with respect thereto and to each other, means for holding the ground wheels yieldably against such movement, and a ground-treating device carried by each beam.

6. A machine of the class described comprising a pair of spaced beams, connections between the beams constructed and arranged for bodily vertical movement of the beams with respect to each other, a balancing gear connected to said beams for holding the same yieldably against such movement, said gear comprising a sprocket chain disposed transversely of the machine, a yielding connection between each end of said chain and the adjacent beam, a pair of sprockets engaged with the ends of said chain, and a sprocket located intermediate the first-mentioned sprockets and engaged with the central portion of said chain, ground wheels carried by said beams and movable vertically with respect thereto and to each other, means for holding the ground wheels yieldably against such movement, and a ground-treating device carried by each beam.

7. A machine of the class described comprising a pair of spaced beams, oppositely-disposed pairs of transversely arranged spaced plates connected with said beams, a longitudinally-slotted vertical plate secured to one pair of plates, a block secured to the other pair of plates and having one end thereof reduced and provided with a roller arranged to fit in the slot in said vertical plate, to permit bodily vertical movement of the beams with respect to each other, means for holding said beams yieldingly against such movement, and a ground-treating device carried by each beam.

8. A machine of the class described comprising a pair of spaced beams, oppositely-disposed pairs of transversely-arranged spaced plates connected with said beams, a longitudinally-slotted vertical plate secured to one pair of plates, a block secured to the other pair of plates and having one end thereof reduced and provided with a roller arranged to fit in the slot in said vertical plate, to permit bodily vertical movement of the beams with respect to each other, a balancing gear connected to said beams for holding the same yieldably against such movement, and a ground-treating device carried by each beam.

9. A machine of the class described comprising a pair of spaced beams, oppositely-disposed pairs of transversely-arranged spaced plates connected with said beams, a longitudinally-slotted vertical plate secured to one pair of plates, a block secured to the other pair of plates and having one end thereof reduced and provided with a roller arranged to fit in the slot in said vertical plate, to permit bodily vertical movement of the beams with respect to each other, a balancing gear connected to said beams for holding the same yieldably against such movement, said gear comprising a sprocket chain disposed transversely of the machine, a yielding connection between each end of said chain and the adjacent beam, a pair of sprockets engaged with the ends of said chain, and a sprocket located intermediate the first-mentioned sprockets and engaged with the central portion of said chain, ground wheels carried by said beams and movable vertically with respect thereto and to each other, means for holding the ground wheels yieldably against such movement, and a ground-treating device carried by each beam.

In testimony whereof, I affix my signature, in presence of two witnesses.

GEORGE W. BARNETT.

Witnesses:
 W. J. MILLER,
 D. HENDERSON.